April 30, 1935. F. MEIWALD Re. 19,551

CIRCUM-KNITTED STRAND ELEMENT AND METHOD OF MAKING SAME

Original Filed Sept. 3, 1931

Inventor,
Franz Meiwald,
By Frank S. Appleman,
Attorney.

Reissued Apr. 30, 1935 Re. 19,551

UNITED STATES PATENT OFFICE 19,551

CIRCUM-KNITTED STRAND ELEMENT AND METHOD OF MAKING SAME

Franz Meiwald, Vienna, Austria

Original No. 1,947,302, dated February 13, 1934, Serial No. 561,066, September 3, 1931. Application for reissue February 26, 1935, Serial No. 8,413. In Germany August 11, 1931

4 Claims. (Cl. 66—190)

Figure 1:
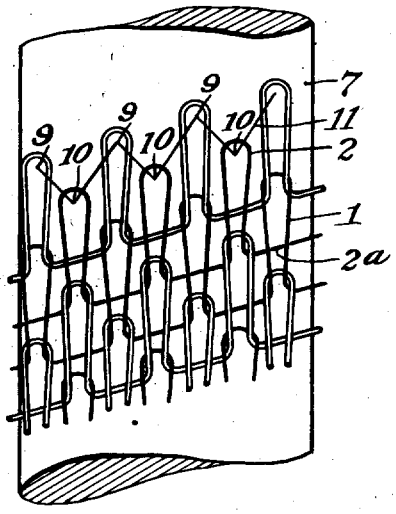

This invention relates to strand elements with a knitted tubular covering, and more particularly to knitting-covered electric conductors and cables and similar elongated elements. It has already been proposed to provide such bodies, and in particular electric conductors and cables, with a knitted instead of a braided or plaited covering for the protection of the insulation or as insulation since in this way a considerable saving of material and labor can be effected, in consequence of the very much greater working capacity of the knitting machine as compared with the rapid braiding machine. The saving thus effected increases with the length of the loops formed in the knitting, and there is thus an incentive to increase as far as possible the length of the loops of the knitted covering. This tendency is, however, accompanied by a certain disadvantage in the appearance of the knitting-covered body, since the rows of knots spaced the length of the loops apart become very prominent, and that more particularly when, for particular reasons, the direction of the loops themselves points in a spiral line around the core, because then the rows of knots become too prominent to make a smooth appearing surface. The loops coincide in such cases substantially with the chord—which may be stretched between the two knotting points of a loop—of an imaginary cylinder determined by the wales of the knitting. Coverings of this type are disclosed for instance in my United States Letters Patents numbered 1,814,324 and 1,936,519 which show central strand elements enclosed by a knitted covering which, however, has the above-mentioned objections.

The present invention has for its object to obviate this drawback without increased consumption of thread material and working time, and consists essentially in effecting the longitudinal displacement, i. e. "staggering", of the neighbouring stitches or loops in relation to each other. The result obtained is particularly effective when this displacement is achieved by spacing of the loops in each course and by displacing the loops of a course in the direction of the course and with respect to the loops of the next preceding course so that the loops of each course extend partway between the loops of the next preceding course, and so that the loops of each course overlie the floats between the loops of the next succeeding course.

Such methods of knitting are known per se but have not been employed hitherto in knitting a covering onto strand elements, in which they constitute a new use, by which novel effects and results are produced which are of great advantage in circum-knitted strand elements referred to hereinbefore. In particular with such an arrangement the bight ends of the loops become more uniformly distributed over the surface of the covering and thus become less prominent, because the bight ends of the loops of adjacent loop courses now form a deep zig-zag line, whose general direction follows the direction of the courses.

The invention is illustrated in the accompanying drawing in which—

Figure 2:
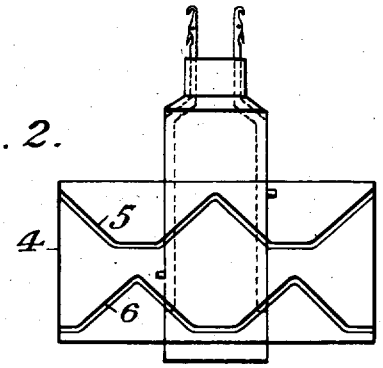

Fig. 1 is a diagrammatic view of the preferred form of knit covering in accordance with this invention, and Fig. 2 is a schematic view of the knitting head and the cams used to produce the knitting, shown in Fig. 1.

As will be noted from Fig. 1, adjacent loops of for instance course 1 are knitted double spaced. The loops of the next consecutive course 2, which are also double spaced but formed with a different thread, are located between the loops of the preceding course 1, i. e. the loop formation points of course 2 are shifted in the direction of that course and with relation to the loop formation points of the preceding course 1, so that the floats $2^a$ between the loops of course 2 cross the loops of course 1. In the particular case of Fig. 1 the floats of each course underlie the loops of the next preceding course, thus producing the effect sought by the invention. In this manner the loops of each course bind the floats between the loops of the next consecutive course against the core 7. This is extremely important in covering a core by a knitted fabric, because as far as I am aware this is the first successful attempt to cover a core, for instance a cable or wire, with a knitted fabric which is ravel-resisting. The reason for this is that by the manner in which this fabric is knitted, namely, with a plurality of independent threads, several independent knitted fabrics are knitted into and between one another, so that the threads of one fabric bind the threads of the other fabric. The cam cylinder 4 (Fig. 2) employed for the manufacture of this type of covering has two grooves 5, 6, each of which has two high points. The individual high points are displaced 90° to each other. Counting the needles consecutively and beginning with one of those guided by the upper groove all odd numbered needles are guided by this upper groove while all even numbered needles are guided by the lower groove. The knitting is done over a suitable core or body 7. The bight ends 9 and 10 of the alternating loops of adjacent loop courses become thus located on a staggered or zig-zag line 11, the general direction of which must follow in all cases the direction in which the appertaining knitted courses extend, in the present case shown for instance in the direction of a close spiral line.

Any suitable knitting method can be employed capable of obtaining the displacement of the bight ends of the loops in order to produce the uniform distribution of these bights over the surface of the core covering in accordance with the present invention.

I claim:—

1. The combination with a central strand element of a knitted fabric surrounding said element and being composed of a plurality of threads knitted into a plurality of individual courses of loops spaced in the direction of the courses with floats between the adjacent loops, the loops of each successive course extending partway into the spaces between the adjacent loops of the next preceding course, and crossing with their floats the loops of said preceding course, whereby the bight ends of the loops of adjacent courses form a zig-zag line on the circum-knitted element, the general direction of which line follows the direction of said adjacent courses.

2. The method of covering strand elements consisting in knitting around said element a plurality of threads to form a plurality of individual courses of loops having relatively long floats between adjacent loops, and in forming the loops of each successive course partway into the spaces between the adjacent loops of the next preceding course in position to cross with their floats the loops of said preceding course, whereby the bight ends of the loops of adjacent courses form a zig-zag line on the circum-knitted element, the general direction of which line follows the direction of said adjacent courses.

3. The combination with a central strand element of a knitted fabric surrounding said element and being composed of a plurality of threads knitted into a plurality of individual spiral courses of loops spaced in the direction of the courses with the floats between the adjacent loops, the loops of each successive course extending partway into the spaces between the adjacent loops of the next preceding course and crossing with their floats the loops of said preceding course, whereby the bight ends of the loops of adjacent courses form a zig-zag line following the spiral direction of the courses around said element.

4. The method of covering strand elements consisting in knitting around said element a plurality of threads to form a plurality of individual spiral courses of loops having relatively long floats between the adjacent loops, and in forming the loops of each successive course partway into the spaces between the adjacent loops of the next preceding course in position to cross with their floats the loops of said preceding course, whereby the bight ends of the loops of two adjacent courses of loops form a zig-zag line following the spiral direction of the courses around said element.

FRANZ MEIWALD.